United States Patent
Smale et al.

(10) Patent No.: US 9,815,950 B2
(45) Date of Patent: *Nov. 14, 2017

(54) INTERMESHING MIXING OF FILLER AND POLYMER SOLUTION MASTERBATCH

(71) Applicant: Bridgestone Corporation, Tokyo (JP)

(72) Inventors: Mark W. Smale, Hudson, OH (US); Zhong-Ren Chen, Stow, OH (US)

(73) Assignee: Bridgestone Corporation, Tokyo (JP)

( * ) Notice: Subject to any disclaimer, the term of this patent is extended or adjusted under 35 U.S.C. 154(b) by 132 days.

This patent is subject to a terminal disclaimer.

(21) Appl. No.: 14/684,907

(22) Filed: Apr. 13, 2015

(65) Prior Publication Data

US 2015/0353689 A1 Dec. 10, 2015

Related U.S. Application Data

(63) Continuation of application No. 13/729,853, filed on Dec. 28, 2012, now Pat. No. 9,006,310.

(60) Provisional application No. 61/582,229, filed on Dec. 30, 2011.

(51) Int. Cl.
| | |
|---|---|
| C08J 3/26 | (2006.01) |
| C08J 3/22 | (2006.01) |
| C08K 5/01 | (2006.01) |
| B60C 1/00 | (2006.01) |
| C08J 3/21 | (2006.01) |

(52) U.S. Cl.
CPC ..................... C08J 3/22 (2013.01); B60C 1/00 (2013.01); C08J 3/212 (2013.01); C08K 5/01 (2013.01)

(58) Field of Classification Search
CPC ..................... C08J 3/22; C08K 5/01
See application file for complete search history.

(56) References Cited

U.S. PATENT DOCUMENTS

| | | | |
|---|---|---|---|
| 6,646,056 B2* | 11/2003 | Zhao | C08L 23/16 524/491 |
| 7,312,271 B2 | 12/2007 | Chen et al. | |
| 7,790,798 B2 | 9/2010 | Chen et al. | |
| 9,006,310 B2* | 4/2015 | Smale | C08J 3/22 523/351 |
| 2003/0109625 A1* | 6/2003 | Galimberti | B60C 1/0016 524/495 |
| 2007/0185267 A1 | 8/2007 | Kobayashi et al. | |
| 2007/0228322 A1 | 10/2007 | Chaves et al. | |

OTHER PUBLICATIONS

Pak, Hannah J., "Office Action for U.S. Appl. No. 13/729,853", dated Jan. 3, 2014, 7 pages.
Lewis, Nathan T., "Response to the Office Action for U.S. Appl. No. 13/729,853", Filed Date: May 2, 2014, 9 pages.
Pak, Hannah J., "Final Office Action for U.S. Appl. No. 13/729,853", dated Jul. 17, 2014, 13 pages.
Lewis, Nathan T., "Response to the Final Office Action for U.S. Appl. No. 13/729,853", Filed Date: Sep. 29, 2014, 10 pages.
Pak, Hannah J., "Advisory Action for U.S. Appl. No. 13/729,853", dated Oct. 30, 2014, 6 pages.
Lewis, Nathan T., "Response to the Advisory Action for U.S. Appl. No. 13/729,853", Filed Date: Nov. 17, 2014, 8 pages.
Pak, Hannah J., "Notice of Allowance for U.S. Appl. No. 13/729,853", dated Dec. 2, 2014, 10 pages.
Lewis, Nathan T., "Amendment After Notice of Allowance for U.S. Appl. No. 13/729,853", Filed Date: Jan. 22, 2015, 4 pages.

* cited by examiner

*Primary Examiner* — Hannah Pak
(74) *Attorney, Agent, or Firm* — Meredith E. Hooker; Nathan T. Lewis

(57) ABSTRACT

A method includes: mixing a polymer cement and a filler to form a solution masterbatch; optionally drying the solution masterbatch to form a crumb polymer composition; mixing a low viscosity polymeric or oligomeric liquid into the solution masterbatch or crumb polymer composition; and intermeshing mixing the solution masterbatch or crumb polymer composition.

20 Claims, 11 Drawing Sheets

INTERMESHING MIXING OF FILLER AND POLYMER SOLUTION MASTERBATCH

CROSS-REFERENCE TO RELATED APPLICATIONS

This application claims the benefit of priority to U.S. application Ser. No. 13/729,853, filed on Dec. 28, 2012, which in turn claims the benefit of priority to U.S. provisional application, Ser. No. 61/582,229, filed on Dec. 30, 2011. These prior applications are incorporated herein by reference for all purposes.

FIELD

This disclosure relates to mixing procedures for a silica-filled polymer composition.

BACKGROUND

Filled polymeric compounds are prepared by mixing polymers with fillers such as silica, carbon black, and/or others. This can be done in what is known as a wet or a dry-mix procedure. Dry mixing is performed with little or no solvent, while the polymer is at melt state during mixing. Wet mixing is performed by combining polymer cement (polymer in solution) or a polymer emulsion with filler in suspension to form a polymer/filler mixture in a liquid media. Thereafter the mixture is dried to form a solution masterbatch.

Wet mixing generally produces good filler macro-dispersion since fillers and polymers are mixed to near uniformity before dried. However, the mixing energy and shear force during a wet mixing process is generally lower than a dry mixing process. Thus, the particle size of the filler dispersed in solution masterbatch from a wet-mix process is typically greater than in a dry-mix masterbatch. Larger particle sizes are not preferred in filled compounds for certain applications. Dry mixing processes provide an opportunity for smaller filler particle sizes, but such processes do not result in optimally dispersed filler.

The compounding of rubber by conventional means in tangential mixers, such as Banbury or Brabender mixers, requires a number of process stages in which raw rubber material in the form of bales undergoes intimate mixing with reinforcing fillers, and other common ingredients used in rubber compounding. Between the process stages, the mixtures are generally cooled on a batch-off system and then may be put into intermediate storage, prior to curing and tire building.

SUMMARY

A method includes: mixing a polymer cement and a filler to form a solution masterbatch; optionally drying the solution masterbatch to form a crumb polymer composition; mixing a low viscosity polymeric or oligomeric liquid into the solution masterbatch or crumb polymer composition; and intermeshing mixing the solution masterbatch or crumb polymer composition.

The term "masterbatch" as used herein means an uncured mixture of polymer and least one other ingredient. The term "masterbatch" includes, but is not limited to, a small amount of a compound that must later be added to a larger composition.

DETAILED DESCRIPTION

A method is disclosed herein that is an enhanced wet-mix process for mixing filled polymeric compounds. In an embodiment, the mixing process reduces the particle size of the filler in the filled compound and further improves the dispersion of the filler in a solution masterbatch.

In an embodiment of the process described herein, an intermeshing extruder or mixer is employed instead of a conventional, tangential, rubber mixer such as a Brabender or Banbury mixer. A dried or half-dried, wet process masterbatch is fed into the intermeshing extruder to subject it to high-shear force. The particle size of the filler is thus reduced, and the filler dispersion is further improved. An amount of oil or polymeric liquid is added to the masterbatch to implement the method. In an embodiment, the filler may be surface-treated or chemically modified. In addition, the polymer may be functionalized.

Rubber articles, such as tires, that are produced from vulcanized elastomers that include smaller filler particles that are better dispersed in the elastomer matrix exhibit performance characteristics that are improved in one or more aspects. Furthermore, the intermeshing process described herein may also simplify and reduce at least one aspect of processing difficulties.

Figure 1:
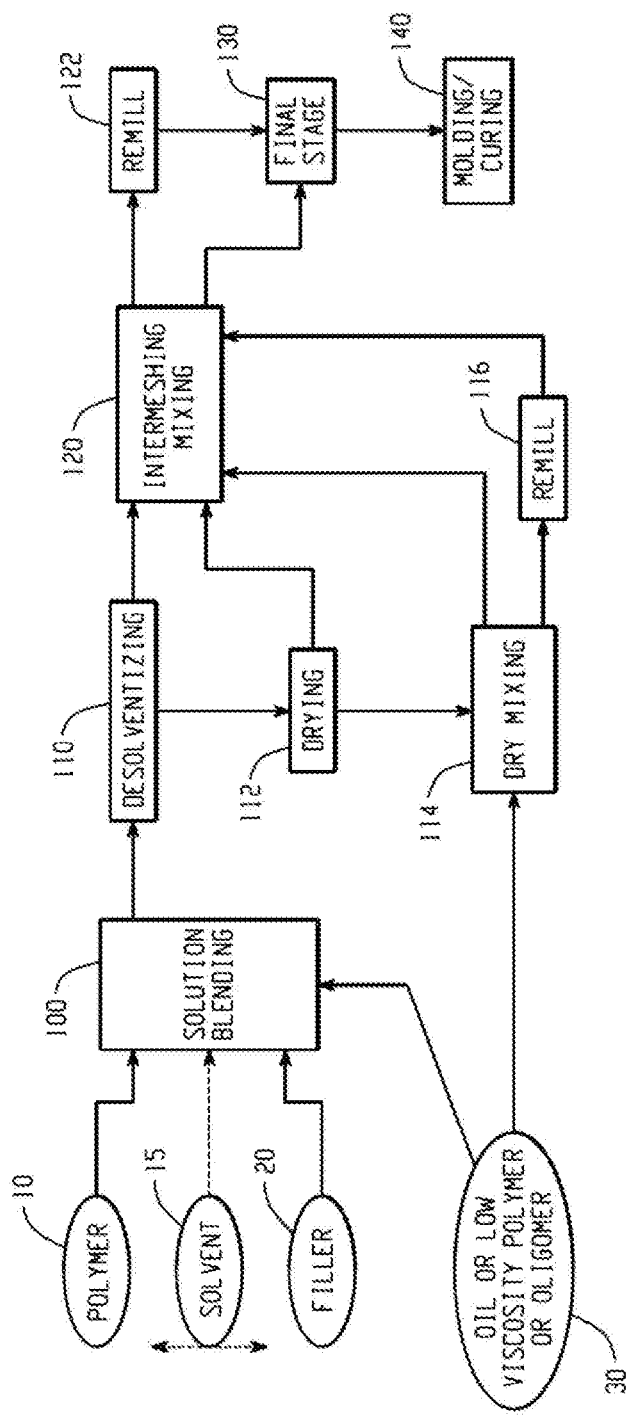
FIG. 1 is an example diagram of an embodiment of the process.

Several embodiments of the method are described herein and reference may be made to FIG. 1, which shows a diagram of certain embodiments of the process.

In an embodiment, a polymer cement is formed by dissolving a polymer 10, such as an elastomer, into a solvent 15. The resulting polymer cement may, for example, be about 5% to about 80% polymer by weight, such as about 10% to about 40%, or about 12% to about 25%. The polymer cement is then blended with a filler 20, which may also optionally be dissolved in a solvent 15, in the solution blending step 100 to form a solution masterbatch. Alternatively, multiple fillers and/or multiple elastomers can be mixed together in one pot.

In another embodiment of the solution blending step 100, a solution masterbatch is formed by adding filler 20 to a solvent 15. The mixture in the vessel is stirred until the filler 20 is substantially evenly dispersed in the solvent 15 to form a slurry. Then the slurry is blended with a polymer 10 that may also optionally be dissolved in a solvent 15 to form a solution masterbatch.

Alternatively, the polymer 10 and filler 20 may be added separately to a solvent 15 in the solution blending step 100 thereby forming a solution masterbatch.

An oil 30 or a low viscosity oligomer or polymer may optionally be added in the solution blending step 100. It can also be added in a later step, e.g. the dry-mixing step 114. This component 30 can be added separately or as a pre-blend with the polymer 10 or filler 20.

In each case mentioned above, in the solution blending step 100 the mixture in the vessel is stirred until the filler 20 is substantially evenly dispersed to form a polymer/filler blend, which may optionally include oil 30. The dispersion of the silica and/or other fillers in the elastomer can be determined by such exemplary methods as measurement by the use of optical micrographs of samples of the rubber and/or by determining a dispersion index by known methods. Suitably, the weight percent of the filler 20 in the blend ranges from about 10 phr to about 120 phr, such as about 15 to about 40 phr, about 30 to about 70 phr, or about 60 to about 110 phr.

In an embodiment, prior to the desolventizing step 110, the silica in the silica slurry or silica/elastomer slurry can be mixed with one or more of the following: one or more additional fillers, one or more additional polymers, one or more surfactants, and one or more silica coupling agents.

The filled-polymer is isolated from the solvent in the desolventizing step 110. Desolventization may be accomplished by any known method including, but not limited to, drum drying, extruder drying, vacuum drying, spray drying, and steam desolventization.

In an embodiment, the desolventized solution masterbatch is dried in an optional drying step 112. Drying may be performed in an oven or by other methods known to those of ordinary skill in the art. In an embodiment, the solution masterbatch is only partially dried in this step 112, such as, for example, it may be dried for about 25% to about 95% of the time required for a completely dry sample, such as about 50% to about 80%, or about 40% to about 50%. The drying step 112 produces a dried or at least partially dried polymeric crumb.

In an embodiment, the polymeric crumb is then mixed in an optional dry mixing stage 114 with a conventional tangential mixer, such as a Banbury or Brabender type mixer. The oil or low viscosity oligomer or polymer may be added in this dry mixing stage 114. Other additives, such as stearic acid or antioxidants, or other additives described below, may also be added in the dry mixing stage 114. As used herein, the term dry mixing includes both mixing with no solvent and mixing with low solvent, such as, for example, about 0.1% to about 5%, about 2% to about 7%, or about 1% to about 10% by weight of solvent in the total mixture.

In an embodiment, an optional remill mixing stage 116 may also be employed after the dry mixing stage 114.

After any one of the preceding four mixing steps, that is, the desolventizing stage 110, the drying stage 112, the dry mixing stage 113 or the remill stage 116, the product of such stage may be added to an intermeshing mixer or extruder to undergo intermeshing mixing 120. Intermeshing mixing imparts high shear forces through the design and rotation of the rotors of the mixing apparatus. Example intermeshing mixers include twin-screw extruders or tandem mixers.

The intermeshing mixing step 120 imparts additional energy to the composition being mixed. For example, this energy may be measured by the difference in the initial temperature and the drop or dump temperature of the composition undergoing mixing. In an embodiment, the temperature difference is about 5° C. to about 50° C., such as, for example, about 10° C. to about 35° C., or about 15° C. to about 30° C.

While the following will be dependent on the mass of the composition and the size of the mixer, inter alia, some example settings are provided. The intermeshing mixer may be set to various power levels such as about 20 to about 100 rpm, about 50 to about 90 rpm, or about 60 to about 80 rpm. The composition may be resident in the intermeshing mixer for a time of about 1 to about 5 minutes, such as, for example, about 2 to about 4 minutes, or about 2.5 to about 3.5 minutes.

If an intermeshing extruder is used, the composition may undergo one or more passes through the extruder. In an embodiment, the composition undergoes multiple passes through the extruder, such as, for example, two, three, four, or five passes through the extruder. In an embodiment, the filler, after undergoing extrusion may be reduced to about 0.1% to about 95% of its particle size, such as, for example, about 10% to about 80%, or about 30% to about 60%.

In an embodiment, after the intermeshing mixing, one or more optional remill stages 122 may also be used to further blend the composition and/or add additional ingredients such as, for example, a silica coupling agent. The remill stage 122 may be carried out in a tangential mixer.

In an embodiment, a final mixing stage 130 is employed wherein a cure package, including at least a cure agent, such as a vulcanizing agent is added. The cure package may also include cure accelerators and activators in a tangential mixer. In some embodiments other ingredients may also be added in this stage.

In the final stage 130, filled rubber compounds can be cured in a conventional manner with known vulcanizing agents at about 0.1 to 10 phr. The vulcanization is conducted in the presence of a sulfur vulcanizing agent. For a general disclosure of suitable vulcanizing agents, one can refer to Kirk-Othmer, Encyclopedia of Chemical Technology, 3rd ed., Wiley Interscience, N.Y. 1982, Vol. 20, pp. 365 to 468, particularly "Vulcanization Agents and Auxiliary Materials," pp. 390 to 402. Examples of sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Desirably, the sulfur vulcanizing agent is soluble sulfur or a mixture of soluble and insoluble polymeric sulfur. The sulfur vulcanizing agents are used in an amount ranging from about 0.1 to about 10 phr, desirably about 1.5 to about 7.5 phr, such as about 1.5 to about 5 phr.

Accelerators are used to control the time and/or temperature required for vulcanization and to improve properties of the vulcanizate. The vulcanization accelerators used in the present invention are not particularly limited. Examples include thiazol vulcanization accelerators, such as 2-mercaptobenzothiazole, dibenzothiazyl disulfide, N-cyclohexyl-2-benzothiazyl-sulfenamide (CBS), N-tert-butyl-2-benzothiazyl sulfenamide (TBBS); or guanidine vulcanization accelerators, such as diphenylguanidine (DPG) or mixtures of one or more of these. The amount of the vulcanization accelerator used is about 0.1 to about 5 phr and, also suitably, about 0.2 to about 3 phr.

After the final stage 130, the filled polymeric composition may be molded and cured 140 to form a polymeric product. Example final products include tires, power belts, and vibration isolators. Tires includes both pneumatic radial tires as well as pneumatic bias ply tires. In embodiments, the composition is a vulcanizable elastomeric composition that can be utilized to form treadstocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components, such as subtreads, black sidewalls, body ply skims, or bead fillers.

The process described herein can be used in conjunction with any solution or emulsion polymerized elastomer. For example, any dried emulsion polymerized elastomer can be mixed in an organic solvent and be suitable for use as the polymer 10 in the embodiments disclosed herein.

The polymer 10, may, for example, be an elastomer that is a solution- or emulsion-polymerized diene elastomer, or a natural rubber that has been dissolved in a solvent. In an embodiment, the polymer 10 is a diene or triene elastomer. In an embodiment, the diene elastomer is selected from polybutadiene, natural rubber, polyisoprene, a copolymer of any two monomers selected from the group consisting of butadiene, isoprene, and a vinyl aromatic monomer, and a terpolymer of vinyl aromatic monomer, butadiene, and isoprene. In an embodiment the vinyl aromatic monomer is styrene or alpha-methyl-styrene. Additional examples of the polymer include butadiene-isoprene copolymer, butadiene-isoprene-styrene terpolymer, isoprene-styrene copolymer, or styrene-butadiene copolymer, and mixtures thereof.

In an embodiment the polymer may be one or more polymers selected from: butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, and tetrafluoroethylene-propylene rubber Solution and emulsion polymerization techniques are well known to those of ordinary skill in the art. For example, conjugated diene monomers, monovinyl aromatic monomers, and triene monomers, can be anionically polymerized to form conjugated diene polymers, or copolymers or terpolymers of conjugated diene monomers and monovinyl aromatic monomers (e.g., styrene and alpha methyl styrene) and triene monomers. Thus, in an embodiment, the elastomeric products can include diene homopolymers from monomer A and copolymers thereof with monovinyl aromatic monomers B. Exemplary diene homopolymers are those prepared from diolefin monomers having from about four to about 12 carbon atoms. Exemplary vinyl aromatic copolymers are those prepared from monomers having from about eight to about 20 carbon atoms. Copolymers can comprise from about 99 percent to about 50 percent by weight of diene units and from about one to about 50 percent by weight of monovinyl aromatic or triene units, totaling 100 percent. The polymers, copolymers, and terpolymers can have 1,2-microstructure contents ranging from about 10 percent to about 80 percent, with the some suitable polymers, copolymers or terpolymers having 1,2-microstructure content of from about 25 to 65 percent, based upon the diene content. The elastomeric copolymers are suitably random copolymers which result from simultaneous copolymerization of the monomers A and B with randomizing agents, as is known in the art.

Solution polymerization is usually conducted in a conventional solvent for anionic polymerizations, such as hexane, cyclohexane, and benzene. In an embodiment, the solution polymerized polymer in solution is used as the polymer cement in the method described herein. If a silica slurry is also used in the method, the polymer cement solvent can be the same or different from the solvent used to prepare the optional silica slurry.

In order to promote randomization in co-polymerization and to increase vinyl content, a polar coordinator can optionally be added to the polymerization ingredients. Amounts range between about one to about 90 or more equivalents per equivalent of lithium. The amount depends upon the type of polar coordinator that is employed, the amount of vinyl desired, the level of styrene employed and the temperature of the polymerizations, as well as the selected initiator. Compounds useful as polar coordinators are organic and include tetrahydrofuran, linear and cyclic oligomeric oxolanyl alkanes such as 2-2-di(tetrahydrofuryl) propane, dipiperidyl ethane, hexamethyl phosphoramide, N-N-dimethyl piperazine, diazabicyclo octane, dimethyl ether, diethyl ether, and tributyl amine. The linear and cyclic oligomeric oxolanyl alkane polar coordinators are described in U.S. Pat. No. 4,429,091, the subject matter of which regarding polar coordinators is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; and tertiary amines, such as tetramethylethylene diamine (TMEDA).

Termination can also be conducted with a functional terminating agent, resulting in a monofunctional polymer. Any compounds providing terminal functionality (i.e., end-capping) that are reactive with the polymer bound carbon-lithium moiety can be selected to provide a functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidinones, tin tetrachloride, tributyl tin chloride, carbon dioxide, and mixtures thereof. Further examples of reactive compounds include the terminators described in co-owned U.S. Pat. Nos. 5,521,309 and 5,066,729, the subject matter of which, pertaining to terminating agents and terminating reactions, is hereby incorporated by reference. Other useful terminating agents can include those of the structural formula $(R)_a ZX_b$, where Z is tin or silicon. R is an alkyl having from about 1 to about 20 carbon atoms; a cycloalkyl having from about 3 to about 20 carbon atoms; an aryl having from about 6 to about 20 carbon atoms, or an aralkyl having from about 7 to about 20 carbon atoms. For example, R can include methyl, ethyl, n-butyl, neophyl, phenyl, or cyclohexyl. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichloride, butyl silicon trichloride, as well as tetraethoxysilane (TEOS), $Si(OEt)_4$, and methyl triphenoxysilane, $MeSi(OPh)_3$.

In an embodiment, terminating to provide a functional group on the terminal end of the polymer may be utilized. In another embodiment, the polymer may be terminated by a coupling reaction with, for example, tin tetrachloride or other coupling agent such as silicon tetrachloride or esters. In an embodiment, the polymer or polymers have at least about 25 percent tin coupling. That is, about 25 percent of the polymer mass after coupling is of higher molecular weight than the polymer before coupling as measured, for example, by gel permeation chromatography. Suitably, before coupling, the polydispersity (the ratio of the weight average molecular weight to the number average molecular weight) of polymers, which can be controlled over a wide range, is from about 1 to about 5, about 1.1 to about 3 and, also suitably, about 1.2 to about 1.7.

The embodiments disclosed herein can employ all types of precipitated silica, including pelletized, granulated and powdered silica as the filler 20. Examples of suitable silicas include, but are not limited to, precipitated amorphous silica, wet silica (hydrated silicic acid), dry silica (anhydrous silicic acid), and calcium silicate. Other suitable fillers include aluminum silicate and magnesium silicate. Among these, are precipitated amorphous wet-process, hydrated silicas. These silicas are so called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. In an embodiment, the surface area for the silica may be, for example, about 32 $m^2/g$ to about 400 $m^2/g$, such as about 100 $m^2/g$ to about 250 $m^2/g$, or about 150 $m^2/g$ to about 220 $m^2/g$. The pH of the silica filler is generally about 5.5 to about 7, such as about 5.8 to about 6.8, or about 6.0 to about 6.9. For purposes of the embodiments of the present invention, the average particle size of the silica added to the solution blending step 100 is about 20 to about 200 microns, such as, for example, about 30 to about 100 microns, or about 40 to about 70 microns.

In an embodiment, the filler is an amorphous precipitated silica. Furthermore, the precipitated silica is optionally pre-treated with a functional group, such as a silica coupling agent, such as a silane, mercaptosilane, or alkoxysilane.

In an embodiment, the amount of the silica in the composition is about 10 phr to about 120 phr, such as about 15 to about 40 phr, about 30 to about 70 phr, or about 60 to about 110 phr.

Suitable commercially available pelletized, granulated, and/or powdered silicas include, but are not limited to, Hi-Sil® 190, Hi-Sil® 210, Hi-Sil® 215, Hi-Sil® 233, Hi-Sil® 243, Flo-Gard® SP, Flo-Gard® LP (PPG Industries), Ultrasil® VN2 and Ultrasil® VN3 (Degussa), Perkasil® KS 300-PD (Grace Davison), Zeosil® 1165MP (Rhone Poulenc) and others available from J. M. Huber Corporation. Powdered silicas that have been functionalized with a pre-surface treatment with a silane are also commercially available and include, but are not limited to, Ciptane® 255 LD and Ciptane® LP (PPG Industries) that are powdered silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. Ciptane® I and Ciptane® TM are pelletized versions of the powdered pre-treated silicas above. Another chemically-modified precipitated amorphous silica that may be used with the process described herein is AGILON 400 manufactured by PPG.

In an embodiment, an additional reinforcing filler may be added. The additional filler may be added in an amount of about 1 to about 60 phr, such as about 5 to about 50 phr, or about 10 to about 25 phr.

In an embodiment, the solvent 15 for use in the solution blending step 100 is an organic solvent, for example hydrocarbon solvents comprised of one or more aromatic, paraffinic, or cycloparaffinic compounds. Such solvents normally contain from about 4 to about 10 carbon atoms per molecule and will be liquid. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, and petroleum naphtha, alone or in admixture. The solvent for the optional silica slurry and the solvent for the elastomer may be the same or different from each other. In an embodiment, the individual solvents are miscible with each other.

In an embodiment, the oil or low viscosity polymeric or oligomeric liquid 30 may be utilized in the amount of about 1 phr to about 70 phr, for example, about 5 phr to about 35 phr, or about 10 phr to about 20 phr. Examples of processing oils include aromatic, naphthenic, and low PCA oils.

Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), and heavy naphthenics. Suitable MES oils are available commercially as CATENEX SNR from SHELL, PROREX 15 and FLEXON 683 from EXXONMOBLE, VIVATEC 200 from BP, PLAXOLENE MS from TOTALFINAELF, TUDALEN 4160/4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180 and ENERTHENE 1849 from BP, and EXTENSOIL 1996 from REPSOL. Suitable heavy naphthenic oils are available as SHELLFELX 794, ERGON BLACK OIL, ERGON H2000, CROSS C2000, CROSS C2400, and SAN JOAQUIN 2000L.

In an embodiment, a low viscosity polymeric or oligomeric liquid is utilized instead of or in addition to the oil. This low viscosity polymeric or oligomeric liquid may be, for example, a homopolymer of conjugated diene monomer or a copolymer of conjugated diene monomers with, for example, vinyl aromatic monomers and/or trienes such as myrcene, among others.

In an embodiment of the low viscosity polymeric or oligomeric liquid, it may comprise one or more conjugated diene monomers, such as, for example, $C_4$-$C_8$ conjugated diene monomers. Specific examples of the conjugated diene monomers include, but are not limited to, 1,3-butadiene, isoprene (2-methyl-1,3-butadiene), cis- and trans-piperylene (1,3-pentadiene), 2,3-dimethyl-1,3-butadiene, 1,3-pentadiene, cis- and trans-1,3hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the mixture thereof.

When the low viscosity polymeric or oligomeric liquid is a copolymer of conjugated diene monomer(s), the comonomer may be vinyl aromatic monomer selected from the group consisting of styrene, ethylvinylbenzene, alpha-methyl-styrene, 1-vinyl naphthalene, 2-vinyl naphthalene, vinyl toluene, methoxystyrene, t-butoxystyrene; as well as alkyl, cycloalkyl, aryl, alkaryl, and aralkyl derivatives thereof, in which the total number of carbon atoms in the monomer is generally not greater than about 20; and mixtures thereof. In exemplary embodiments, the conjugated diene monomer and vinyl aromatic monomer are normally used at the weight ratios of about 99:1 to about 1:99, or about 30:70 to about 90:10, or about 85:15 to about 60:40.

The number average molecular weight (Mn) of the low viscosity polymeric or oligomeric liquid may be controlled (e.g. by controlling the ratio of monomers to initiator) within the range of from about 2,000 to about 120,000, within the range of from about 40,000 to about 80,000, or within the range of from about 3,000 to about 40,000.

In an embodiment, the glass transition temperature (Tg) of the low viscosity polymeric or oligomeric liquid is, for example, within the range of from about −90° C. to about −20° C., such as within the range of from about −90° C. to about −40° C., or from about −90° C. to about −50° C. The low viscosity polymeric or oligomeric liquid may exhibit only one glass transition temperature.

In an embodiment, the low viscosity polymeric or oligomeric liquid may comprise polyisoprene, polybutadiene, styrene-butadiene copolymer, styrene-isoprene-butadiene copolymer, styrene-isoprene copolymer, butadiene-isoprene copolymer, liquid butyl rubber, liquid neoprene, ethylene-propylene copolymer, ethylene-propylene-diene copolymer, acrylonitrile-butadiene copolymer, liquid silicone, ethylene acrylic copolymer, ethylene vinyl acetate copolymer, liquid epichlorohydrin, liquid chlorinated polyethylene, liquid chlorosulfonated polyethylene rubbers, liquid hydrogenated nitrile rubber, liquid tetrafluoroethylene-propylene rubber, liquid hydrogenated polybutadiene, crown ether, fluorine-containing oligomers, polybutenes, xylene resins, chlorinated rubber, polyethylene wax, petroleum resins, rosin ester rubber, polyalkylene glycol diacrylate, plasticizers composed of esters including phthalic, aliphatic dibasic acid, glycol, fatty acid, phosphoric and stearic esters, epoxy plasticizers, phthalate, adipate, sebacate, phosphate, and polyether and polyester plasticizers, hydrocarbon lubricants such as paraffin and wax, fatty acid lubricants such as C6-C20 fatty acids, fatty acid amide lubricants such as fatty acid amide and alkylene-bisfatty acid amide, ester lubricants such as fatty acid-lower alcohol ester, fatty acid-polyhydride alcohol ester and fatty acid-polyglycol ester, alcoholic lubricants such as fatty alcohol, polyhydric alcohol, polyglycol and polyglycerol, metallic soaps, or the mixture of one or more of these.

In an embodiment, the low viscosity polymeric or oligomeric liquid is a styrene-butadiene polymer or oligomer comprised of repeat units that are derived from about 5 weight percent to about 95 weight percent styrene and correspondingly from about 5 weight percent to about 95 weight percent 1,3-butadiene, wherein the repeat units derived from styrene and 1,3-butadiene are in essentially random order. In some embodiments, the low viscosity polymeric or oligomeric liquid may have a vinyl percentage of about 10% to about 70%, for example, about 20% to about 60%, or about 45% to about 55%.

The mixing steps of the foregoing embodiments can include the optional substep of mixing the polymer cement or the dry mixture with optional additional ingredients prior to or after the desolventizing step 110, such as, for example, in the solution blending step 100, the dry mixing step 114, the remill steps 116 and 122, or the intermeshing mixing step 120. Certain additional component may even be pre-blended with the polymer 10, solvent 15, filler 20, or oil 30. For example, the additional ingredients can include, but are not limited to, one or more additional fillers, one or more additional elastomers, silica coupling agents, silica shielding agents, surfactants, resins, including tackifying resins, plasticizers, pigments, fatty acid, zinc oxide, waxes, antioxidants, anti-ozonants, peptizing agents, and/or other known rubber composition additives.

Regarding additional elastomers, these can be added, for example, in the dry mixing step 114, the remill steps 116 and 122, or the intermeshing mixing step 120. For treadstock articles, the elastomer described herein can be utilized as 100 parts of the rubber in the treadstock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, co- or ter-polymers of monomers selected from butadiene, isoprene, and vinyl-aromatic monomers, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, and tetrafluoroethylene-propylene rubber. When the elastomer described herein is blended with conventional rubbers, the amounts can vary widely with a lower limit comprising about 10 percent to about 20 percent by weight of the total rubber. The minimum amount will depend primarily upon the physical properties desired.

Regarding additional fillers, these may include reinforcing fillers, non-reinforcing fillers, polymer microparticle fillers, polymer nanoparticle fillers, other types of nanoparticle fillers, and mixtures thereof. Suitable additional reinforcing fillers include, but are not limited to, carbon black, silicates such as calcium silicate, aluminum silicate, magnesium silicate, clay (hydrous aluminum silicate), talc (hydrous magnesium silicate), and mica. Suitable non-reinforcing fillers including, but not limited to, titanium dioxide, urea, and sodium sulfate are known in the art of rubber compounding.

In an embodiment, carbon black can be present, for example, in the solution masterbatch in amounts ranging from about one to about 50 phr and about five to about 35 phr. The carbon blacks can include any of the commonly available, commercially-produced carbon blacks. Such carbon blacks can have a surface area (EMSA) of at least about 20 m$^2$/g and, suitably, at least about 35 m$^2$/g up to about 200 m$^2$/g or higher. Surface area values used in this application are determined by ASTM D-1765 using the cetyltrimethylammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention can be in pelletized form or an unpelletized flocculent mass. Suitably, unpelletized carbon black provides a greater dispersion of the carbon black in the polymer.

In an embodiment, polymer microparticle fillers and polymer nanoparticle fillers may also be incorporated—the preparation of which is disclosed in U.S. Pat. No. 6,872,785, the entire disclosure of which is hereby incorporated by reference.

Surfactants that are soluble in organic solvents can be added to the silica slurry and/or silica slurry/polymer mixture. Surfactants tend to stabilize the dispersion of the silica in the polymer. Suitable surfactants include, but are not limited to, polyethylene glycol type surfactants such as fatty acid-ethylene oxide adducts, polyhydric alcohol fatty acid ester-ethylene oxide adducts, polyether-modified silicones, and polypropylene glycol-ethylene oxide adducts. Examples of polyhydric alcohol type surfactants are fatty acid esters of glycerol, fatty acid esters of pentaerythritol, fatty acid esters of hydrogenated and non-hydrogenated C5 and C6 sugars (e.g., sorbose, mannose, and arabinose) including, but not limited to, the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated C5 and C6 sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maze® 80.

Polyoxyethylene derivatives of fatty acid esters of hydrogenated and non-hydrogenated C5 and C6 sugars are also useful surfactants and can include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate® 80, Tween® 80, Emsorb® 6900, Liposorb® O-20, and T-Maz® 80. The Tween® products are commercially available from ICI Specialty Chemicals.

A useful amount of any of these surfactants is about 0.1% to about 25% by weight based on the weight of the silica, with about 0.5% to about 20% by weight being suitable, and about 1% to about 15% by weight based on the weight of the silica also suitable.

Other ingredients can include additives that are non-reactive with the polymer but act as silica/polymer stabilizing agents. For example, silica shielding agents. In particular, silanes such as alkyl alkoxysilanes. In addition, silica coupling agents can include, but are not limited to, bifunctional silica coupling agents having a moiety (e.g., an alkoxysilyl group) reactive with the silica surface, and a moiety (e.g., a mercapto, amino, vinyl, epoxy or sulfide group) that binds to the elastomer. Well known examples of such silica coupling agents are mercaptosilanes, bis(trialkoxysilylorgano) polysulfides, such as bis(3-triethoxysilylpropyl) tetrasulfide which is sold commercially as Si69 by Degussa, and 3-thiocyanatopropyl trimethoxysilane. These bifunctional silica coupling agents offer excellent coupling between rubber and silica, resulting in rubbers having improved wet ice skid resistance, rolling resistance and tread wear. Particularly suitable silica coupling agents for use in the embodiments of the invention are pre-reacted with the silica. For example, commercially available powdered silicas that have been pre-surface treated with a silane are suitable and include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica.

Typical amounts of tackifier resins, if used, comprise about 0.5 to about 10 phr, usually about one to about 5 phr. Typical amounts of compounding aids comprise about one to about 50 phr. Such compounding aids can include, for example, aromatic, naphthenic, and/or paraffinic processing oils. Typical amounts of antioxidants, comprise about 0.1 to about 5 phr. Suitable antioxidants, such as diphenyl-p-phenylenediamine, are known to those skilled in the art. Typical amounts of anti-ozonants comprise about 0.1 to about 5 phr.

Typical amounts of fatty acids, if used, which can include stearic acid, palmitic acid, linoleic acid or a mixture of one or more fatty acids, can comprise about 0.5 to about 3 phr. Typical amounts of zinc oxide comprise about one to about 5 phr. Typical amounts of waxes comprise about one to about 2 phr. Often microcrystalline waxes are used. Typical amounts of peptizers, if used, comprise about 0.1 to about 1 phr. Typical peptizers can be, for example, pentachlorothiophenol and dibenzamidodiphenyl disulfide.

EXAMPLES

Examples 1-4

In examples 1-4, 1.5 kg of powder silica (FLOGARD SP) was mixed with 18.8 kg of styrene-butadiene rubber (SBR) cement (i.e. SBR in hexane solution). The polymer cement had 17% by weight of SBR, with 20% styrene and 56% vinyl, and an Mn of approximately 157 kg/mol. The mixture was then stirred for 30 minutes in order for the filler to be approximately evenly distributed in the polymer cement. The mixture was then steam desolventized at 80° C. and 300 rpm, and then oven dried at 80° C. This dried crumb rubber had about 1.7% of volatiles (water).

In Examples 2-4, the oven dried crumb was added to an intermeshing twin-screw extruder at 120° C., with residence time of about 120 seconds. In each of Examples 2-4 the dried crumb was passed through the extruder in a single, separate pass. Example 1 was not subject to the intermeshing extruder processing step.

Figure 2:
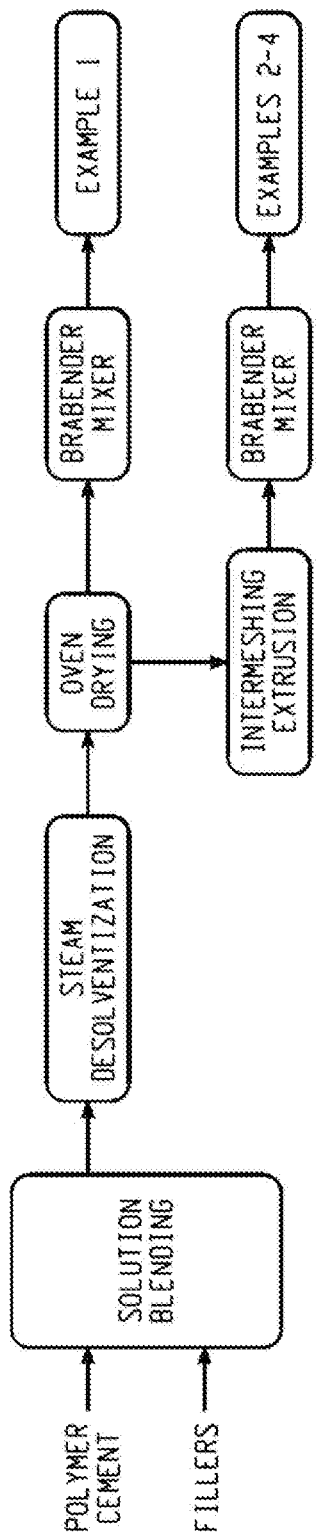
FIG. 2 is a process diagram corresponding to Examples 1-4.

The dry crumb rubber of Example 1 (SMB) and the extrusion processed rubber (SMB-E 1, 2, & 3) of Examples 2-4 were then dry-mixed in a 300 g Brabender with additives. Silane coupling agent (Si69) was added in the remill stage, and sulfur and curing aids were added in the final stage. Tables 1 and 2 show further details of the mixing process. FIG. 2 shows a diagram of these mixing procedures. For purposes of correlation with FIG. 1 the first and remill stages of Examples 1-4 may be considered part of the remill step 122 of FIG. 1.

Figure 3:
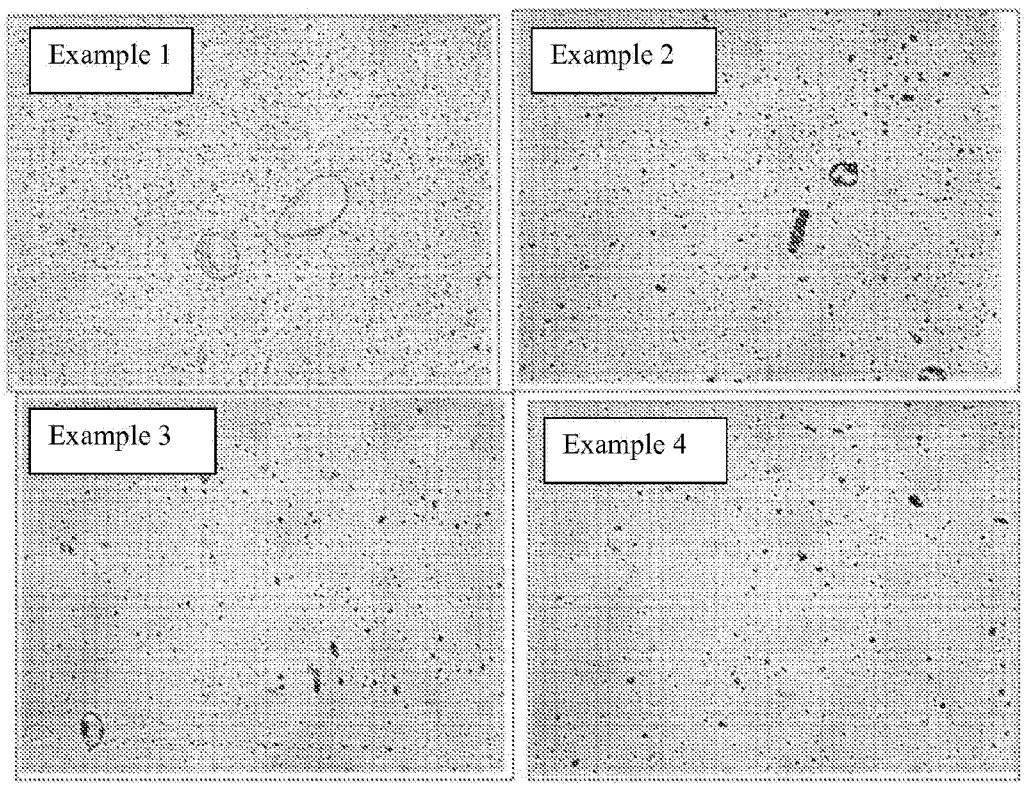
FIG. 3 shows TEM micrographs of filler dispersion and particle size in Examples 1-4.

Test results for processability and cured compound properties are reported in Table 3. As shown in Table 3, Examples 2-4 have increased bound rubber. Other properties were comparable or had small improvement. FIG. 3 shows a TEM image of each of Examples 1-4.

TABLE 1

|  | Example 1 | Ex. 2, 3, 4 |
|---|---|---|
| MB |  |  |
| SMB Crumb (Dry) | 145 |  |
| SMB-E1, 2, 3 |  | 145 |
| Aromatic Oil |  |  |
| Stearic acid | 2 | 2 |
| Santoflex 13 | 1 | 1 |
| Total | 158 | 158 |

TABLE 1-continued

|  | Example 1 | Ex. 2, 3, 4 |
|---|---|---|
| Remill |  |  |
| MB | 158 | 158 |
| Degussa Si69 | 4.5 | 4.5 |
| Total | 162.5 | 162.5 |
| Final |  |  |
| Remill | 162.5 | 162.5 |
| Zinc Oxide | 3 | 3 |
| DPG | 0.5 | 0.5 |
| MBTS | 1 | 1 |
| TBBS | 1 | 1 |
| Sulfur | 1.15 | 1.15 |
|  | 169.15 | 169.15 |

TABLE 2

|  | Ex. 1 | Ex. 2 | Ex. 3 | Ex. 4 |
|---|---|---|---|---|
| Start Temp C. | 101 | 101 | 99 | 99 |
| Dump Temp C. | 143.0 | 142.0 | 130.0 | 143.0 |
| Time (min.) | 3:00 | 3:00 | 3:00 | 3:00 |
| RPM | 70 | 70 | 70 | 70 |
| Final Weight | 309.3 | 308.9 | 310.4 | 308.5 |
| Remill |  |  |  |  |
| Start Temp C. | 102 | 101 | 101 | 100 |
| Dump Temp C. | 140.0 | 139.0 | 142.0 | 141.0 |
| Time (min.) | 1:30 | 1:30 | 1; 30 | 1:30 |
| RPM | 70 | 70 | 70 | 70 |
| Final Weight | 300.45 | 301.25 | 300.64 | 301.28 |
| Final |  |  |  |  |
| Start Temp C. | 80 | 81 | 81 | 82 |
| Dump Temp C. | 100.0 | 99.0 | 99.0 | 99.0 |
| Time (min.) | 1:15 | 1; 15 | 1:15 | 1:15 |
| RPM | 40 | 40 | 40 | 40 |
| Final Weight | 299.2 | 299.7 | 299.6 | 299.5 |

TABLE 3

|  |  | Ex. 1 | Ex. 2 | Ex. 3 | Ex. 4 |
|---|---|---|---|---|---|
| MDR2000 | MH | 21.40 | 19.27 | 18.08 | 16.74 |
|  | ML | 0.78 | 0.80 | 0.72 | 0.62 |
|  | TC 90 (min) | 14.35 | 15.37 | 15.84 | 16.41 |
|  | ML1 + 4 | 20.03 | 22.02 | 22.55 | 22.26 |
| Bound rubber |  |  | 18.00 | 24.38 | 26.50 |
| Dispersion Rating | % | 82.7 | 88.3 | 91.6 | 92.4 |
| Wet Stanley London |  | 64.4 | 67.2 | 68.6 | 68.6 |
| Lambourn Wear Rate | 25% | 0.0613 | 0.0515 | 0.0492 | 0.0505 |
|  | 65% | 0.1058 | 0.1083 | 0.1169 | 0.1146 |
| Pendulum Rebound | 23 C. | 54.4 | 54.2 | 54.4 | 57.2 |
|  | 50 C. | 68.8 | 69.4 | 69.0 | 70.0 |
| Dynastat | 23 C. | 0.112 | 0.106 | 0.105 | 0.099 |
|  | 50 C. | 0.089 | 0.086 | 0.092 | 0.080 |
| TempSwp | RR (Tan d @60 C.) | 0.107 | 0.094 | 0.102 | 0.110 |
|  | Handling (G'@30 C.) | 4.66E+06 | 4.91E+06 | 4.48E+06 | 3.92E+06 |
|  | Dry (Tand @30 C.) | 0.134 | 0.120 | 0.126 | 0.136 |
|  | Wet (Tand @ 0 C.) | 0.248 | 0.244 | 0.249 | 0.273 |
|  | Snow (G* @ −20 C.) | 4.92E+07 | 5.05E+07 | 4.85E+07 | 4.89E+07 |
| StrainSwp | RR (Tan d @60 C.) | 0.091 | 0.085 | 0.087 | 0.082 |
|  | Handling (G'@30 C.) | 3.03E+06 | 2.37E+06 | 2.27E+06 | 1.90E+06 |
|  | Dry (Tand @30 C.) | 0.108 | 0.102 | 0.100 | 0.096 |
|  | Wet (Tand @ 0 C.) | 0.207 | 0.206 | 0.204 | 0.207 |
|  | Payne Effect (D G'@30 C.) | 1.44E+06 | 8.08E+05 | 7.13E+05 | 4.31E+05 |
| DinDie (23 C.) | MPa M100 | 2.21 | 1.97 | 1.93 | 1.85 |
|  | EB % | 601 | 609 | 684 | 624 |

Examples 5 and 6

In Examples 5 and 6, 1.5 kg of treated silica powder, CIPTANE LP from PPG was mixed with 18.8 kg of SBR cement (i.e. SBR in hexane solution). The polymer cement has 17% of SBR, with 20% styrene and 56% vinyl, and an Mn of approximately 157 kg/mol. The mixture was then stirred for 45 minutes in order for the filler to be approximately evenly distributed in the polymer cement. The mixture was then steam desolventized at 80° C. and 300 rpm, and then oven dried at 80° C. This produced dried crumb rubber with about 1.7% of volatiles (water).

Figure 4:
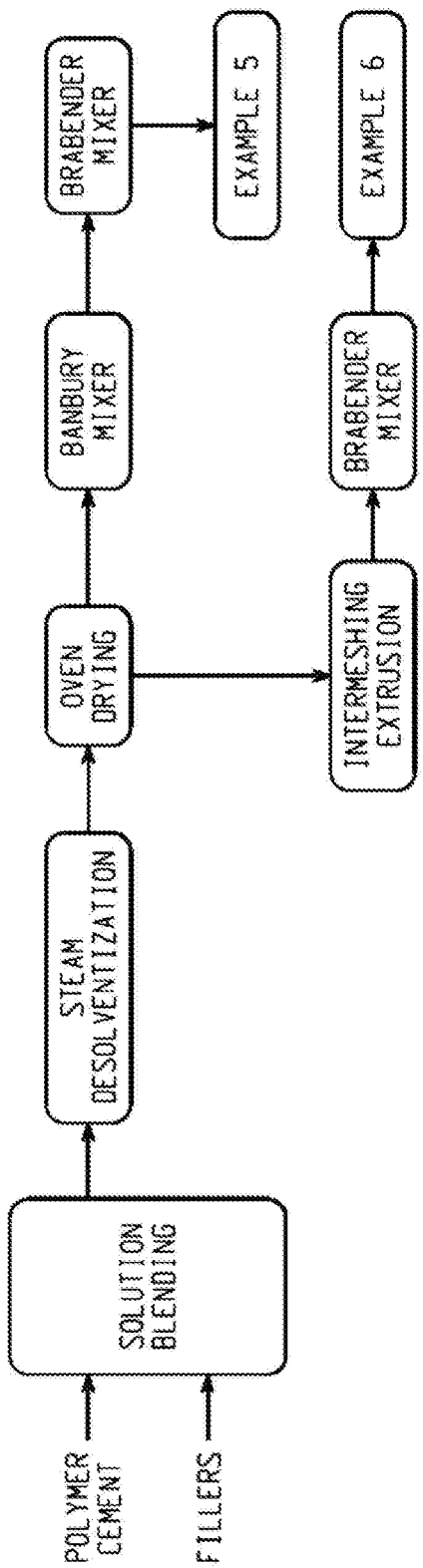
FIG. 4 is a process diagram corresponding to Examples 5 and 6.

In Example 5, half of the dried crumb rubber (SMB Crumb) was mixed in a 300 g Banbury mixer prior to be mixed in a 300 g Brabender. In Example 6 the other half of the dried SMB crumb (SMB-E1) was first extruded in an intermeshing twin-screw extruder at 115° C., with residence time of about 2 minutes. Then extruded SMB-E1 was mixed in a 300 g Brabender. No silane was added during the remill stage of either Example 5 or 6, because the treated CIPTANE LP silica already contained mercaptosilane. Tables 4 and 5 report further details of the Brabender mixing procedure. FIG. 4 shows a diagram of these mixing procedures.

Figure 5:
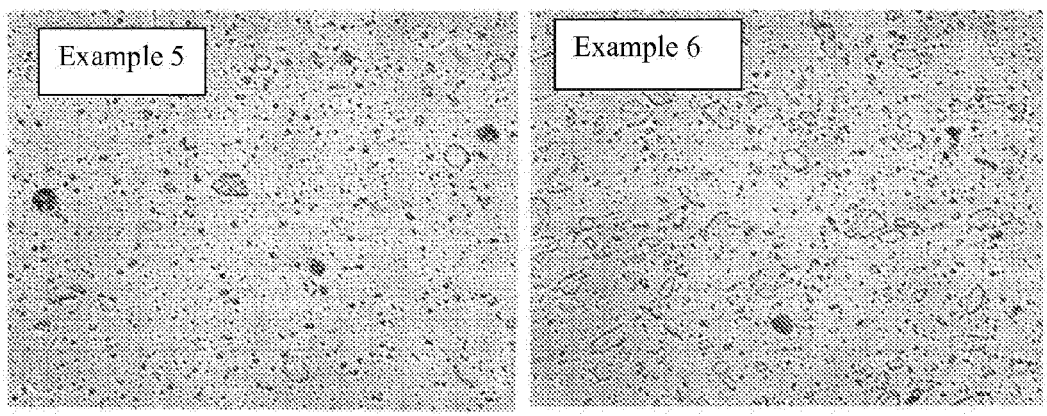
FIG. 5 shows TEM micrographs of filler dispersion and particle size in Examples 5 and 6.

Test results for processability and cured compound properties are reported in Table 6, and a TEM micrograph of Examples 5 and 6 is provided in FIG. 5.

TABLE 4

|  | Ex. 5 | Ex. 6 |
|---|---|---|
| MB |  |  |
| SMB Crumb (Dry) | 145 |  |
| SMB-E1 |  | 145 |
| Aromatic Oil |  |  |
| Stearic acid | 2 | 2 |
| Santoflex 13 | 1 | 1 |
| Total | 158 | 158 |

TABLE 4-continued

|  | Ex. 5 | Ex. 6 |
|---|---|---|
| Remill |  |  |
| MB | 158 | 158 |
| Degussa Si69 | 4.5 | 4.5 |
| Total | 162.5 | 162.5 |
| Final |  |  |
| Remill | 162.5 | 162.5 |
| Zinc Oxide | 3 | 3 |
| DPG | 0.5 | 0.5 |
| MBTS | 1 | 1 |
| TBBS | 1 | 1 |
| Sulfur | 1.15 | 1.15 |
|  | 169.15 | 169.15 |

TABLE 5

|  | Ex. 5 | Ex. 6 |
|---|---|---|
| Start Temp C. | 103 | 102 |
| Dump Temp C. | 149.0 | 145.0 |
| Time (min.) | 3:00 | 3:00 |
| RPM | 70 | 70 |
| Final Weight | 308.4 | 309.3 |
| Remill |  |  |
| Start Temp C. | 102 | 102 |
| Dump Temp C. | 143.0 | 138.0 |
| Time (min.) | 1:30 | 1:30 |
| RPM | 70 | 70 |
| Final Weight | 300.9 | 301.6 |
| Final |  |  |
| Start Temp C. | 82 | 80 |
| Dump Temp C. | 105.0 | 102.0 |
| Time (min.) | 1:15 | 1; 15 |
| RPM | 40 | 40 |
| Final Weight | 299.7 | 299.0 |

TABLE 6

|  |  | Ex. 5 | Ex. 6 |
|---|---|---|---|
| MDR2000 | MH | 21.81 | 17.00 |
|  | ML | 1.11 | 0.95 |
|  | TC 90 (min) | 11.41 | 9.72 |
|  | ML1 + 4 | 36.70 | 40.60 |
| Bound rubber |  | 31.08 | 36.76 |
| Dispersion Rating | % | 87.4 | 78.0 |
| Wet Stanley London |  | 64.2 | 63.8 |
| Lambourn Index | 25% | 0.0772 | 0.0990 |
|  | 65% | 0.1471 | 0.1490 |
| Pendulum Rebound | 23 C. | 55.1 | 54.4 |
|  | 50 C. | 74.2 | 74.0 |
| Dynastat | 23 C. | 0.061 | 0.073 |
|  | 50 C. | 0.045 | 0.052 |
| TempSwp | RR (Tan d @60 C.) | 0.051 | 0.045 |
|  | Handling (G'@30 C.) | 3.63E+06 | 2.64E+06 |
|  | Dry (Tand @30 C.) | 0.076 | 0.067 |
|  | Wet (Tand @ 0 C.) | 0.349 | 0.366 |
|  | Snow (G* @ −20 C.) | 7.62E+07 | 6.73E+07 |
| StrainSwp | RR (Tan d @60 C.) | 0.044 | 0.050 |
|  | Handling (G'@30 C.) | 2.02E+06 | 1.70E+06 |
|  | Dry (Tand @30 C.) | 0.062 | 0.069 |
|  | Wet (Tand @ 0 C.) | 0.222 | 0.238 |
|  | Payne Effect (D G'@30 C.) | 2.46E+05 | 1.69E+05 |
| DinDie (23 C.) | MPa M100 | 2.53 | 2.18 |
|  | EB % | 313 | 341 |

Examples 7-9

In Examples 7-9, 1.5 kg of powder treated silica (CIPTANE LP) was mixed with 18.8 kg of SBR cement (i.e., SBR in hexane solution). The polymer cement had 17% by weight of SBR, with 20% styrene and 56% vinyl, and an Mn of approximately 157 kg/mol. The mixture was then stirred for 45 minutes in order for the filler to be approximately evenly distributed in the polymer cement. The mixture was then steam desolventized at 80° C. and 300 rpm, and then oven dried at 80° C. This dried crumb rubber had about 1.7% of volatiles (water). The oven-dried crumb was then mixed in a 300 g Banbury mixer with oil and other additives listed in Table 7 to produce a masterbatch.

In Example 7 one-third of the masterbatch was remilled in a 300 g mixer prior to the final mix stage.

In Example 8, one-third of the masterbatch was extruded through an intermeshing mixer by one pass prior to the final mix stage. The extrusion temperature was 115° C., with a residence time of 120 seconds.

In Example 9 one-third of the masterbatch was extruded through an intermeshing mixer by two passes prior to the final mix stage. The extrusion temperature was 115° C., with a residence time of 120 seconds each pass.

Figure 6:
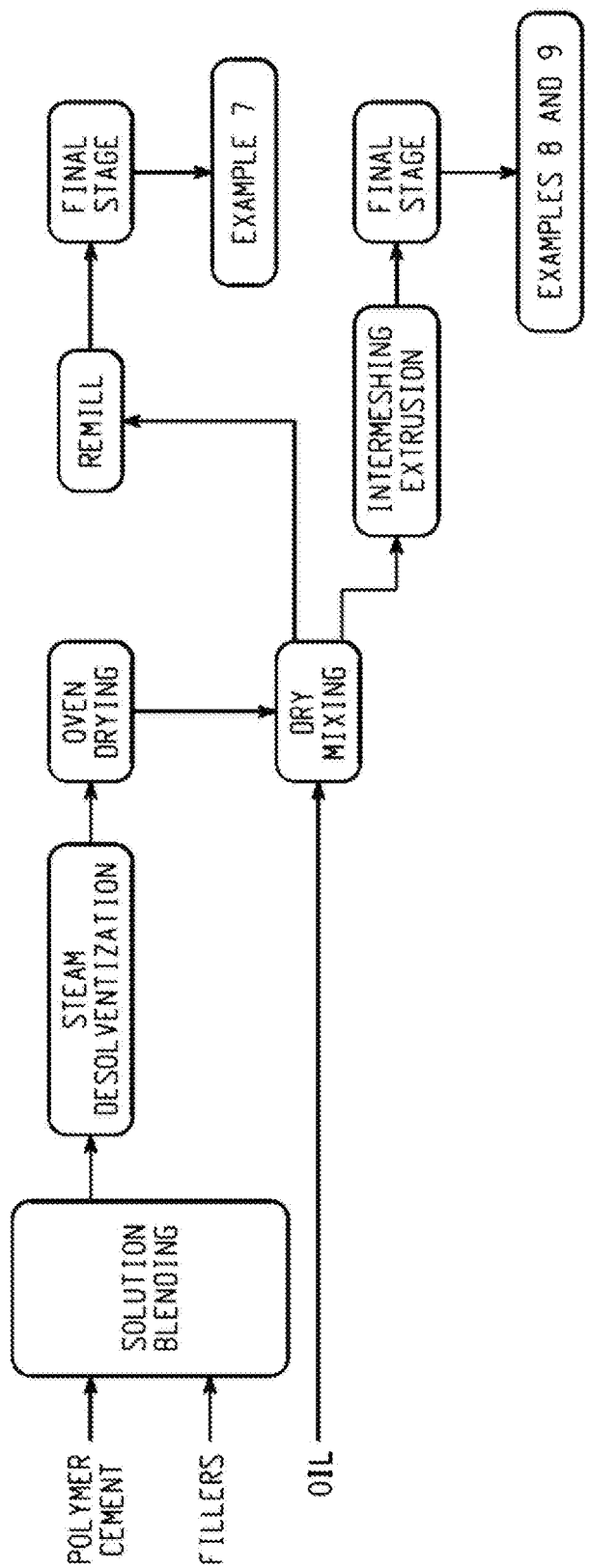
FIG. 6 is a process diagram corresponding to Examples 7-9.

Each of Examples 7-9 were then mixed with curatives in a final mix stage in a 300 g Banbury mixer. Tables 7 and 8 show further details of the mixing process. FIG. 6 shows a diagram of these mixing procedures.

Figure 7:
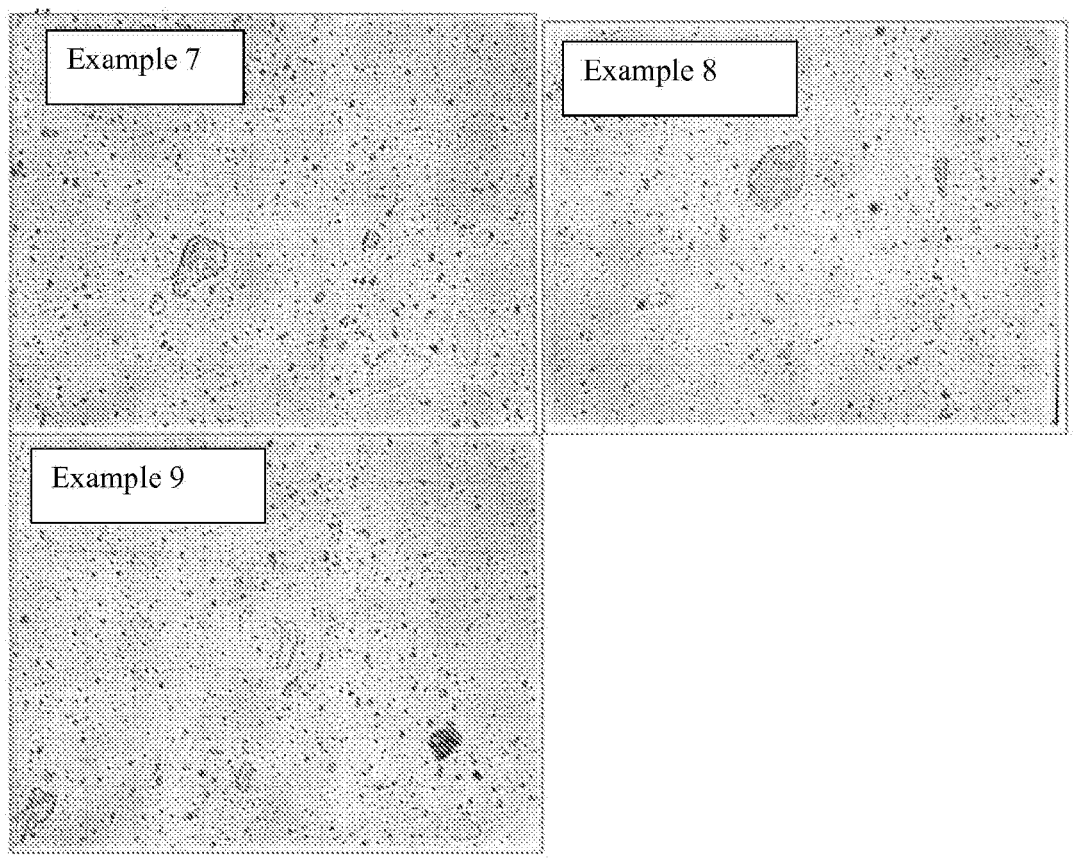
FIG. 7 shows TEM micrographs of filler dispersion and particle size in Examples 7-9.
Figure 8:
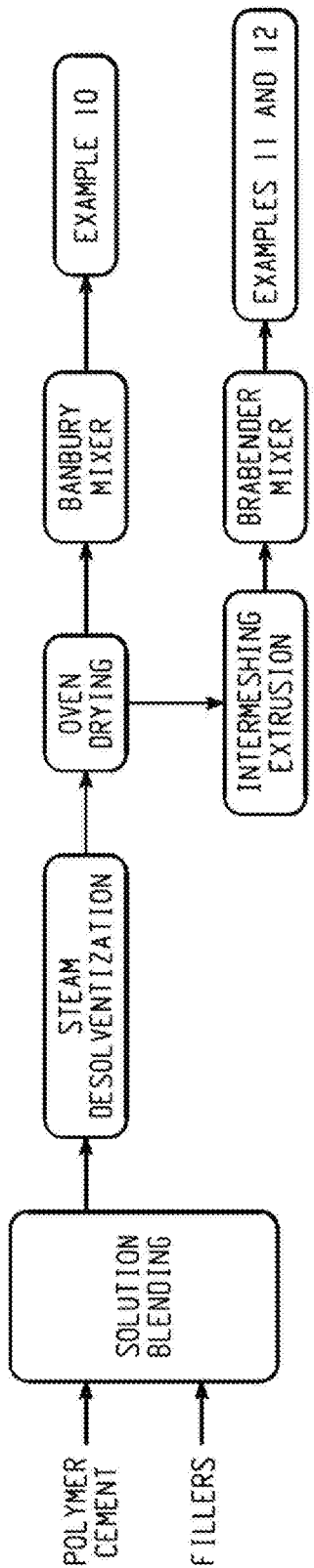
FIG. 8 is a process diagram corresponding to Examples 10-12.

Test results for processability and compound properties are reported in Table 9. Although the total input of mixing energy was comparable in each of Examples 7-9, Examples 8 and 9, that were processed with intermeshing mixing, showed improvement in wear resistance and hysteresis. FIG. 7 shows a TEM image of each of Examples 7-9.

TABLE 7

|  | Example 7 | Example 8 | Example 9 |
|---|---|---|---|
| Masterbatch |  |  |  |
| SMB Crumb | 145 | 145 | 145 |
| Oil | 10 | 10 | 10 |
| Stearic Acid | 2 | 2 | 2 |
| Santoflex 13 | 1 | 1 | 1 |
| Total | 158 | 158 | 158 |
| Intermeshing Mixing |  | 158 | 158 |
| Remill | 158 |  |  |
| Final | 158 | 158 | 158 |
| Zinc Oxide | 3 | 3 | 3 |
| DPG | 0.5 | 0.5 | 0.5 |
| MBTS | 1 | 1 | 1 |
| TBBS | 1 | 1 | 1 |
| Sulfur | 2.7 | 2.7 | 2.7 |
|  | 166.2 | 166.2 | 166.2 |

TABLE 8

|  | Example 7 | Example 8 | Example 9 |
|---|---|---|---|
| Masterbatch |  |  |  |
| Start Temp C. | 102 | 102 | 101 |
| Dump Temp C. | 143.0 | 143.0 | 143.0 |
| Time (min.) | 3:00 | 3:00 | 3:00 |
| RPM* | 40/60 | 40/60 | 40/60 |

TABLE 8-continued

|  | Example 7 | Example 8 | Example 9 |
|---|---|---|---|
| Final Weight | 1285.0 | 1285.0 | 1285.0 |
| Intermeshing Mixing** | no | 1 pass | 2 pass |
| Remill |  | no | no |
| Start Temp C. | 101 |  |  |
| Dump Temp C. | 140 |  |  |
| Time (min.) | 0.1 |  |  |
| RPM | 0:00 |  |  |
| Final Weight | 300 |  |  |
| Final |  |  |  |
| Start Temp C. | 80 | 82 | 82 |
| Dump Temp C. | 106.0 | 106.0 | 104.0 |
| Time (min.) | 1:10 | 1:10 | 1; 10 |
| RPM | 40 | 40 | 40 |
| Final Weight | 300.0 | 300.0 | 300.0 |

TABLE 9

|  |  | Example 7 | Example 8 | Example 9 |
|---|---|---|---|---|
| MDR2000 | MH | 20.63 | 17.53 | 16.70 |
|  | ML | 0.96 | 0.75 | 0.85 |
|  | TC 90 (min) | 8.66 | 7.72 | 7.58 |
|  | ML1 + 4 | 30.22 | 30.11 | 32.90 |
| Wet Stanley London |  | 67.6 | 70.4 | 69.6 |
| Lambourn | 25% | 0.0790 | 0.0399 | 0.0459 |
| Index | 65% | 0.1376 | 0.1237 | 0.1269 |
| Pendulum | 23 C. | 55.4 | 57.6 | 58.4 |
| Rebound | 50 C. | 74.2 | 76.8 | 76.2 |
| Dynastat | 23 C | 0.061 | 0.055 | 0.536 |
|  | 50 C. | 0.047 | 0.038 | 0.036 |
| TempSwp | RR (Tan d @60 C.) | 0.056 | 0.037 | 0.030 |
|  | Handling (G'@30 C.) | 4.00E+06 | 2.26E+06 | 2.17E+06 |
|  | Dry (Tand @30 C.) | 0.081 | 0.061 | 0.054 |
|  | Wet (Tand @ 0 C.) | 0.335 | 0.391 | 0.369 |
|  | Snow (G* @ −20 C.) | 7.71E+07 | 7.05E+07 | 6.57E+07 |
| DinDie | MPa M100 | 2.33 | 2.14 | 2.10 |
| (23 C.) | EB % | 347 | 356 | 335 |

Examples 10-12

In Examples 10-12, 1.5 kg of treated silica powder, CIPTANE LP from PPG was mixed with 18.8 kg of tri-ethoxysilane (TEOS)-terminated SBR cement (i.e. SBR in hexane solution). The polymer had a base ML4 of 48, styrene/vinyl content of 21.5/55.6, Cp ML4 of 83, Tg of −38.5 C, and Mn/% Coupled of about 216 kg/mol/68.7. The mixture was then stirred for 45 minutes in order for the filler to be approximately evenly distributed in the polymer cement. The mixture was then steam desolventized at 80° C. and 300 rpm, and then oven dried at 80° C. This produced dried crumb rubber with about 1.7% of volatiles (water).

In Example 10, a third of the dried crumb rubber was mixed in a 300 g Banbury mixer with a remill and final stage as shown in Tables 10 and 11. No silane coupling agent was added during the remill since the CIPTANE LP already contained mercaptosilane.

In Example 11, another third of the dried crumb rubber was extruded in an intermeshing twin-screw extruder at 115° C. with a residence time of about 2 minutes. The extruded silica-filled rubber (SMB-E1) was then mixed in a 300 g Brabender with a remill and final stage as shown in Tables 10 and 11. Again, no additional silane coupling agent was added.

In Example 12, another third of the dried crumb rubber was extruded in an intermeshing twin-screw extruder for a total of three passes, each pass was at 115° C. with a residence time of about 2 minutes. The extruded silica-filled rubber (SMB-E2) was then mixed in a 300 g Brabender with a remill and final stage as shown in Tables 10 and 11. Again, no additional silane coupling agent was added.

Figure 9:
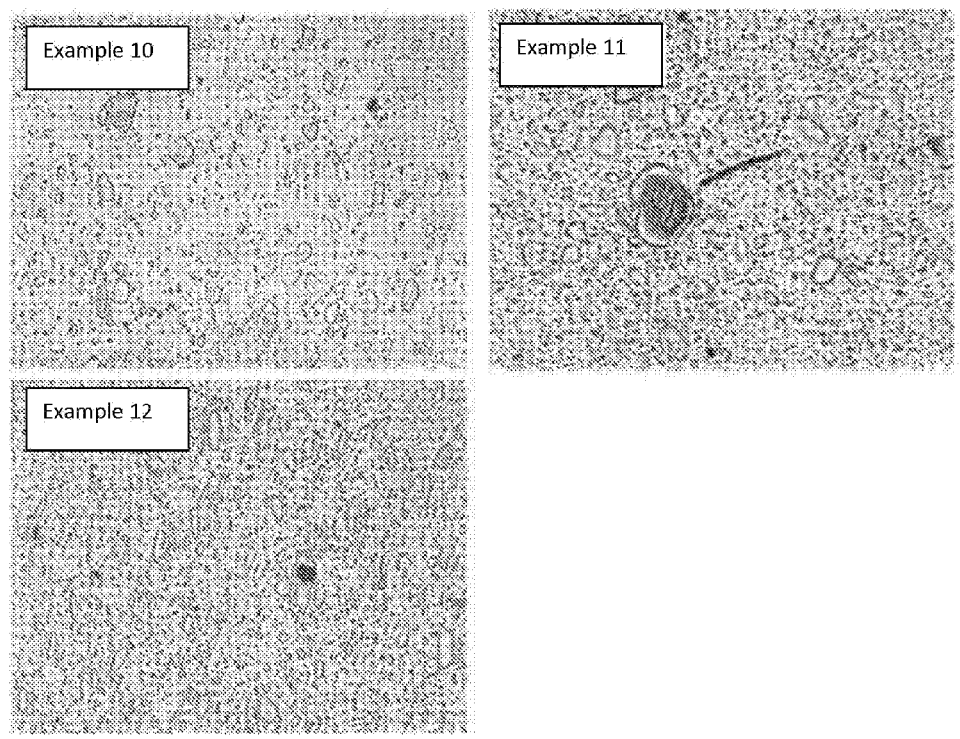
FIG. 9 shows TEM micrographs of filler dispersion and particle size in Examples 10-12.
Figure 10:
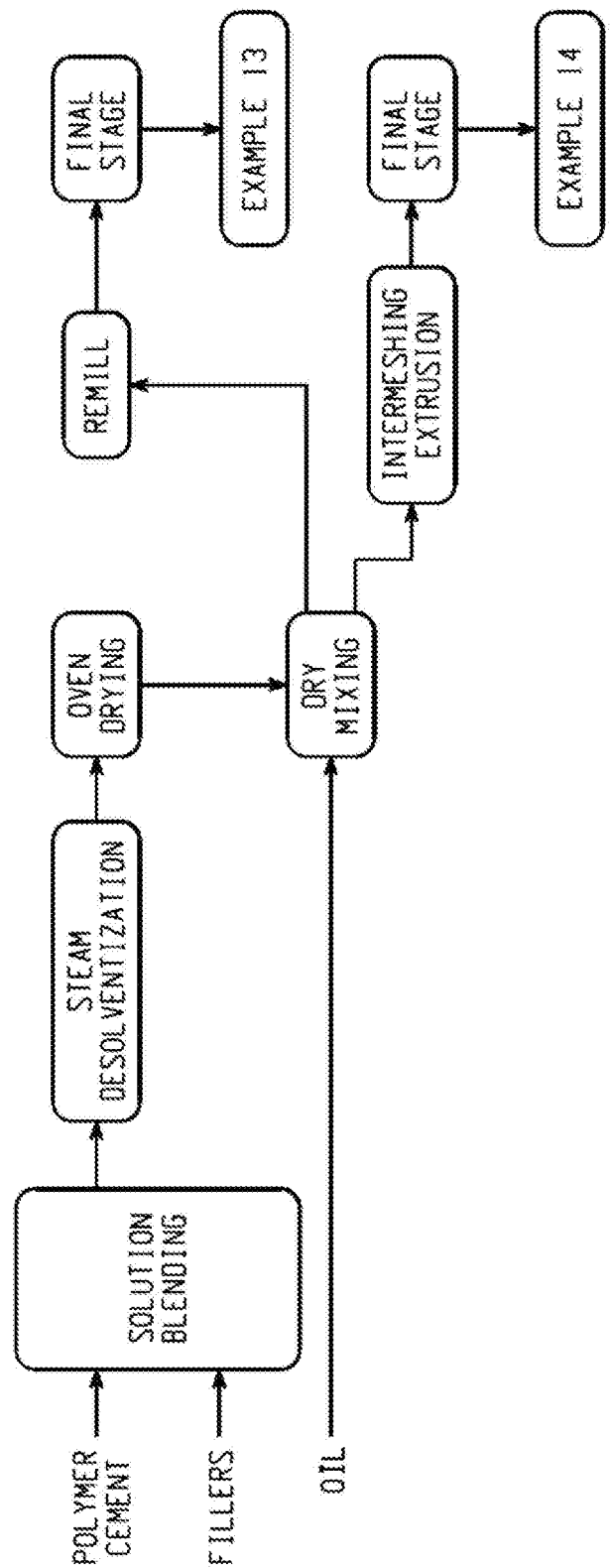
FIG. 10 is a process diagram corresponding to Examples 13 and 14.

Test results for processability and cured compound properties are reported in Table 12, and a TEM micrograph of Examples 10-12 is provided in FIG. 9.

TABLE 10

|  | Ex. 10 | Ex. 11 | Ex. 12 |
|---|---|---|---|
| MasterBtach |  |  |  |
| SMB Crumb | 145 |  |  |
| SMB-E1 |  | 145 |  |
| SMB-E3 |  |  | 145 |
| Aromatic Oil |  |  |  |
| Stearic acid | 2 | 2 | 2 |
| Santoflex 13 | 1 | 1 | 1 |
| Total | 158 | 158 | 158 |
| Remill |  |  |  |
| masterbatch | 158 | 158 | 158 |
| Final |  |  |  |
| Remill | 158 | 158 | 158 |
| Zinc Oxide | 3 | 3 | 3 |
| DPG | 0.5 | 0.5 | 0.5 |
| MBTS | 1 | 1 | 1 |
| TBBS | 1 | 1 | 1 |
| Sulfur | 2.7 | 2.7 | 2.7 |
| Total | 166.2 | 166.2 | 166.2 |

TABLE 11

|  | Ex. 10 | Ex. 11 | Ex. 12 |
|---|---|---|---|
| Masterbatch |  |  |  |
| Start Temp C. | 101 | 102 | 102 |
| Dump Temp C. | 146.0 | 143.0 | 144.0 |
| Time (min.) | 3:00 | 3:00 | 3:00 |
| RPM | 70 | 70 | 70 |
| Final Weight | 310.0 | 308.6 | 307.0 |
| Remill |  |  |  |
| Start Temp C. | 100 | 101 | 102 |
| Dump Temp C. | 143.0 | 137.0 | 142.0 |
| Time (min.) | 1:30 | 1:30 | 1:30 |
| RPM | 70 | 70 | 70 |
| Final Weight | 301 | 297.8 | 299.5 |
| Final |  |  |  |
| Start Temp C. | 81 | 80 | 80 |
| Dump Temp C. | 101.0 | 96.0 | 99.0 |
| Time (min.) | 1:10 | 1:10 | 1:10 |
| RPM | 40 | 40 | 40 |
| Final Weight | 299.3 | 299.7 | 298.6 |

TABLE 12

| Treated Silica, TEOS-terminated SBR |  | Ex. 10 | Ex. 11 | Ex. 12 |
|---|---|---|---|---|
| MDR2000 | MH | 25.98 | 25.38 | 20.59 |
|  | ML | 1.33 | 1.37 | 1.67 |
|  | TC 90 (min) | 15.91 | 14.48 | 13.99 |
|  | ML1 + 4 | 110.54 | 124.74 | 113.03 |
| Dispersion Rating | % | 79.3 | 55.4 | 80.1 |
| Wet Stanley London |  | 62.0 | 63.2 | 64.2 |
| Lambourn | 25% | 0.1029 | 0.1521 | 0.1211 |
| Index | 65% | 0.1474 | 0.2020 | 0.1837 |
| Pendulum | 23 C. | 52.0 | 50.8 | 49.8 |
| Rebound | 50 C. | 74.2 | 72.6 | 71.0 |

TABLE 12-continued

| Treated Silica, TEOS-terminated SBR | | Ex. 10 | Ex. 11 | Ex. 12 |
|---|---|---|---|---|
| Dynastat | 23 C. | 0.065 | 0.076 | 0.083 |
| | 50 C. | 0.048 | 0.057 | 0.060 |
| TempSwp | RR (Tan d @60 C.) | 0.048 | 0.055 | 0.056 |
| | Handling (G'@30 C.) | 3.05E+06 | 3.20E+06 | 3.30E+06 |
| | Dry (Tand @30 C.) | 0.073 | 0.081 | 0.085 |
| | Wet (Tand @ 0 C.) | 0.409 | 0.415 | 0.432 |
| | Snow (G* @ −20 C.) | 9.61E+07 | 1.03E+08 | 1.23E+08 |
| DinDie | MPa M100 | 3.43 | 3.79 | 3.33 |
| (23 C.) | EB % | 262 | 230 | 257 |

Examples 13 and 14

In Examples 10-12, 1.5 kg of treated silica powder, CIPTANE LP, was mixed with 18.8 kg of triethoxysilane (TEOS)-terminated SBR cement (SBR in hexane). The polymer had a base ML4 of 48, styrene/vinyl content of 21.5/55.6, Cp ML4 of 83, Tg of −38.5 C, and Mn/% Coupled of about 216 kg/mol/68.7. The mixture was then stirred for 45 minutes in order for the filler to be approximately evenly distributed in the polymer cement. The mixture was then steam desolventized at 80° C. and 300 rpm, and then oven dried at 80° C. This produced dried crumb rubber with about 1.7% of volatiles (water).

The oven-dried crumb was then mixed in a 1300 g Banbury mixer with the ingredients and mixing procedure listed in Tables 13 and 14.

In Example 13 one half of the mixed batch was further processed in a remill stage.

In Example 14, the other half of the mixed batch was further processed by extruding it through an intermeshing mixer in one pass. The extrusion temperature was 115° C., with a residence time of 120 seconds.

Both Examples 13 and 14 were then mixed with curatives in a final mix stage in 300 g Banburay mixer as detailed in Tables 13 and 14.

Figure 11:
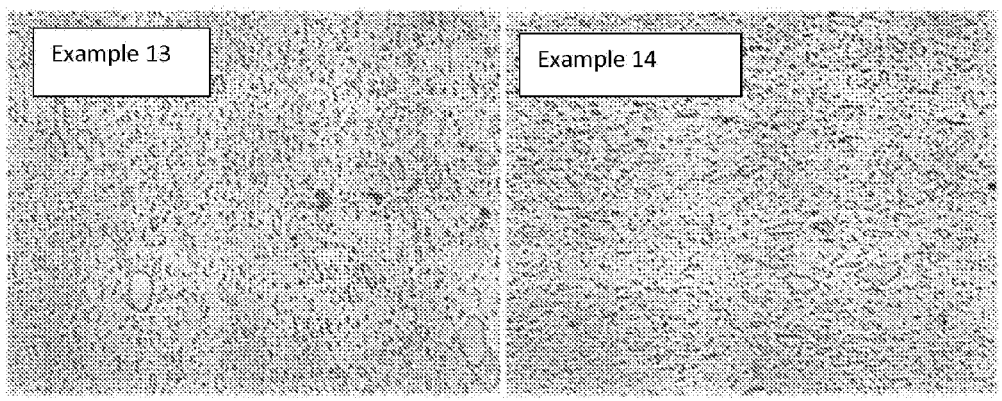
FIG. 11 shows TEM micrographs of filler dispersion and particle size in Examples 13 and 14.

Test results for processability and cured compound properties are reported in Table 15, and a TEM micrograph of Examples 13 and 14 is provided in FIG. 11.

Example 14 exhibits an improvement in hysteresis and wear.

TABLE 13

| | Example 13 | Example 14 |
|---|---|---|
| Masterbatch | | |
| SMB Crumb | 145 | 145 |
| Oil | 10 | 10 |
| Stearic Acid | 2 | 2 |
| Santoflex 13 | 1 | 1 |
| Total | 158 | 158 |
| Intermeshing Mixing | | 158 |
| Remill | 158 | |
| Final | 158 | 158 |
| Zinc Oxide | 3 | 3 |
| DPG | 0.5 | 0.5 |
| MBTS | 1 | 1 |
| TBBS | 1 | 1 |
| Sulfur | 2.7 | 2.7 |
| | 166.2 | 166.2 |

TABLE 14

| | Example 13 | Example 14 |
|---|---|---|
| Masterbatch | | |
| Start Temp C. | 102 | 102 |
| Dump Temp C. | 143.0 | 143.0 |
| Time (min.) | 3:00 | 3:00 |
| RPM* | 40/60 | 40/60 |
| Final Weight | 1285.0 | 1285.0 |
| Intermeshing Mixing | no | 700 |
| Remill | | no |
| Start Temp C. | 101 | |
| Dump Temp C. | 140 | |
| Time (min.) | 0.1 | |
| RPM | 0:00 | |
| Final Weight | 300 | |
| Final | | |
| Start Temp C. | 80 | 82 |
| Dump Temp C. | 106.0 | 106.0 |
| Time (min.) | 1:10 | 1:10 |
| RPM | 40 | 40 |
| Final Weight | 300.0 | 300.0 |

*1 minute at 40 rpm and two minutes at 60 rpm

TABLE 15

| Oil-Assisted, Treated silica, TEOS-SBR | | Example 13 | Example 14 |
|---|---|---|---|
| MDR2000 | MH | 27.40 | 25.13 |
| | ML | 6.04 | 5.78 |
| | TC 90 (min) | 17.90 | 18.56 |
| | ML1 + 4 | | 134.60 |
| Wet Stanley London | | 65.0 | 61.2 |
| Lambourn Index | 25% | 0.1108 | 0.1084 |
| | 65% | 0.1525 | 0.1506 |
| Pendulum Rebound | 23 C. | 51.8 | 53.2 |
| | 50 C. | 73.6 | 74.6 |
| Dynastat | 23 C. | 0.069 | 0.071 |
| | 50 C. | 0.056 | 0.055 |
| TempSwp | RR (Tan d @60 C.) | 0.060 | 0.050 |
| | Handling (G'@30 C.) | 3.47E+06 | 3.62E+06 |
| | Dry (Tand @30 C.) | 0.084 | 0.071 |
| | Wet (Tand @ 0 C.) | 0.385 | 0.380 |
| | Snow (G* @ −20 C.) | 2.43E+08 | 2.52E+08 |
| DinDie (23 C.) | MPa M100 | 3.52 | 3.60 |
| | EB % | 280 | 265 |

It is claimed:

1. A method for making a polymeric composition, the method comprising:
    a) mixing a polymer cement and a filler to form a solution masterbatch;
    b) optionally, at least partially drying the solution masterbatch to form a crumb polymer composition;
    c) mixing a polymeric or oligomeric liquid into the solution masterbatch or crumb polymer composition, the polymeric or oligomeric liquid having a number average molecular weight of from about 2,000 to about 120,000;
    d) intermeshing mixing the solution masterbatch or crumb polymer composition; and
    e) at least one of: (i) mixing the crumb polymer composition of step (b) in a tangential mixer or (ii) mixing the intermeshing mixed composition produced from step (d) in a tangential mixer to form the polymeric composition.

2. The method of claim 1, comprising at least partially drying the solution masterbatch to form the crumb polymer composition.

3. The method of claim 2, further comprising dry mixing the crumb polymer composition prior to intermeshing mixing to produce a dry crumb rubber composition.

4. The method of claim 1, wherein the intermeshing mixing is performed in a twin-screw extruder or a tandem mixer.

5. The method of claim 3, wherein the polymeric or oligomeric liquid is mixed into the dry crumb rubber composition at the dry mixing step.

6. The method of claim 1, wherein the polymeric or oligomeric liquid is mixed into the solution masterbatch.

7. The method of claim 3, wherein the dry mixing is performed in a tangential mixer.

8. The method of claim 1, wherein the filler comprises silica.

9. The method of claim 8, wherein the silica is functionalized with a functional group that will interact with the polymer of the polymer cement.

10. The method of claim 1, wherein the polymeric or oligomeric liquid is a process oil selected from the group consisting of: aromatic oil, naphthenic oil, oil having a polycyclic aromatic content of less than 3 percent by weight as determined by IP346 method, or combinations thereof.

11. The method of claim 1, wherein the polymer of the polymer cement is a diene elastomer.

12. The method of claim 11, wherein the diene elastomer is functionalized with a functional group that interacts with a filler.

13. The method of claim 12, wherein the functional group comprises a silane, mercaptosilane, or alkoxysilane.

14. The method of claim 11, wherein the diene elastomer is selected from: polybutadiene, natural rubber, polyisoprene, a copolymer of any two monomers selected from the group consisting of butadiene, isoprene, and a vinyl aromatic monomer, and a terpolymer of a vinyl aromatic monomer, butadiene monomer, and isoprene monomer.

15. The method of claim 1, wherein a composition that is a product of the intermeshing mixing is further processed in a dry-mix procedure.

16. The method of claim 1, further comprising forming the polymeric composition into a tire component.

17. The method of claim 1, wherein the step of at least partially drying the solution masterbatch is performed for at least about 25% of the time required for completely drying the solution masterbatch.

18. A tire component formed by a process comprising:
a) mixing a polymer cement and a filler to form a solution masterbatch;
b) optionally, at least partially drying the solution masterbatch to form a crumb polymer composition;
c) mixing a polymeric or oligomeric liquid into the solution masterbatch or the crumb polymer composition, the polymeric or oligomeric liquid having a number average molecular weight of from about 2,000 to about 120,000;
d) intermeshing mixing the solution masterbatch or the crumb polymer composition;
e) at least one of: (i) mixing the crumb polymer composition of step (b) in a tangential mixer or (ii) mixing the intermeshing mixed composition produced from step (d) in a tangential mixer; and
f) forming the composition into a tire component.

19. The tire component of claim 18, wherein the process further comprises adding sulfur curing agents to the composition after step (d).

20. The tire component of claim 18, further comprising at least partially drying the solution masterbatch to form a crumb polymer composition and dry mixing the crumb polymer composition prior to intermeshing mixing.

* * * * *